Patented Mar. 1, 1938

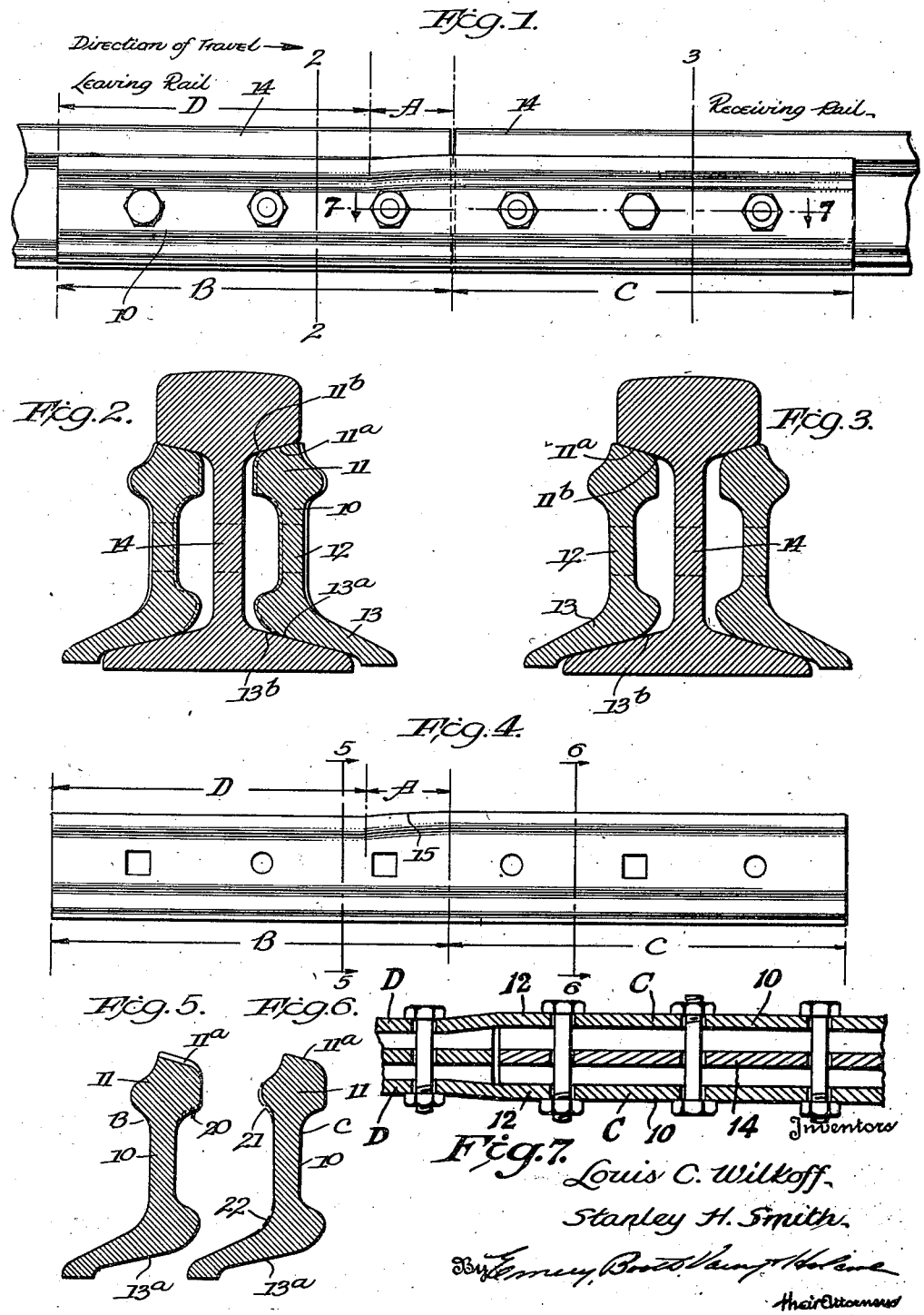

2,110,102

UNITED STATES PATENT OFFICE 2,110,102

RAIL JOINT

Louis C. Wilkoff, Youngstown, and Stanley H. Smith, Cleveland, Ohio, assignors to Youngstown Steel Car Corporation, Niles, Ohio, a corporation of Ohio Application November 24, 1934, Serial No. 754,662

11 Claims. (Cl. 238—243)

The present invention relates to joints between railway tracks and aims to improve generally the joint as well as to provide a new splice bar therefor.

More particularly, the invention aims to improve the joints for heavy duty one-way track, especially on main double track lines where the traffic on each track is confined largely to one-way travel, or whereon loads predominate in one direction.

Extensive tests over a considerable period of time on such track have demonstrated that the wear on the splice bars and the rail at the joint is much greater on the half section of the joint connected to the receiving track than on the other half which is connected to the leaving track. Furthermore, the portion of joint connected to the receiving rail is subjected to wear substantially throughout its length; whereas the portion of joint connected to the leaving rail appears to be subjected to wear only from the center of the joint to slightly beyond the adjacent bolt hole, and the end of the joint at the leaving rail showing little if any wear.

When wear occurs between cooperative fishing surfaces of splice bars and rails, the hammering or pounding of the wheels over the joints causes wear on the rail fishing surfaces, particularly the rail head fishing surface, as well as the head fishing surface of the bar. Accordingly, to obtain theoretically perfect support for the rail ends, it is necessary that full fishing contact be provided between the bar and both the head and flange fishing surfaces of the rail, and this fishing contact should advantageously exist throughout the length of the bar.

The principal aim and object of the present invention therefore, is to provide an improved rail joint, particularly for one-direction track, employing either new or worn rails and in which there is a full continuous fishing engagement between the bar and the fishing surfaces of the rail, which joint is constructed to receive greater shock without appreciable wear adjacent the joint and through the supported end of the receiving rail.

Another principal aim and object of the invention is to improve the construction of splice bar for the above described use, which bar may be readily constructed either as new bars or bars renewed from worn standard bars in pairs, the bars of each pair having uniform characteristics so as to uniformly cooperate with each other and with the fishing surface of the intermediate rail to give satisfactory results.

In order that the invention may be fully understood reference is had to the accompanying drawing and following more detailed description of certain preferred embodiments of the invention. In the drawing Fig. 1 is a side elevation of a rail joint and splice bar according to our invention;

Fig. 2 is a transverse section of the joint taken on the line 2—2 of Fig. 1;

Fig. 3 is a transverse section of the joint taken on the line 3—3 of Fig. 1;

Fig. 4 is a side elevation of one embodiment of our improved splice bar;

Fig. 5 is a section thereof taken on the line 5—5 of Fig. 4;

Fig. 6 is a section thereof taken on the line 6—6 of Fig. 4; and

Fig. 7 is a horizontal sectional view illustrating in somewhat exaggerated form the position of the bar as applied to the rail section of a rail joint.

The rail joint according to the present invention is similar to the standard type of joint for railway track, in that it comprises a pair of splice bars 10, each having a head 11, web 12 and base flange 13, the head 11 and base flange 13 having inclined fishing surfaces 11$^a$ and 13$^a$ adapted for fishing engagement with the head fishing surface 11$^b$ and flange fishing surface 13$^b$ of adjacent rail ends 14. The splice bar 10 may conveniently be of any required length and constructed with the required number of bolt holes.

On main line double track most, if not all, of the travel on each track is in one direction only, and hence for each joint in such track one of the rail ends may be designated the "leaving rail" and the other the "receiving rail", and in Fig. 1 we have so designated the respective rails 14. Experiments and tests have disclosed that the wear on splice bars and fishing surfaces of joints for such track occurs to the center section A of the half B of the bar connected to the leaving rail, and substantially throughout the other half of the bar which is connected to the receiving rail. The remainder of the half B of the bar is subjected to very little if any wear.

Accordingly, to overcome these conditions of uneven wear and to provide a joint of adequate strength at all points throughout its length, we provide a splice bar similar to a standard splice bar with respect to length, cross section, number of bolt holes and the like. The portion D of the section B of the bar connected to the leaving rail is preferably of normal fishing height throughout its length, that is, it is of such height as is normally required for a bar for the particular size rail with which it is used, giving normal fishing support and normal draw space between the bar and rail web. Preferably the fishing height of the portion D is uniform through the length of the portion or at least its head fishing surface is uniformly parallel to a horizontal plane, so as to provide normal fishing for the head and flange fishing surfaces 11$^b$ and 13$^b$ respectively, throughout the major portion of the joint of the leaving rail 14.

The portion C of the bar, that is, the half section of the bar connected to the receiving rail, is formed with an average fishing height greater than the average fishing height of the remainder, and being of greater average fishing height, does not fit the receiving rail as closely as does the portion B of the bar. This permits of additional or substantially greater draw space for the section C, as indicated by the dotted lines in Fig. 2 to the end that the portion of the joint which is subjected to the greatest wear will have the greatest draw space and hence a longer period of usefulness. Advantageously the fishing height of the section C of the bar is uniform throughout the section C so as to provide a uniform load supporting engagement between the bar and the receiving rail throughout the length of the joint.

The intermediate section A preferably also is of inclined fishing height which tapers and preferably is convexly curved as at 15, from the adjacent end of the portion C toward the portion D, this curved upper fishing surface fitting the rail fishing surface adjacent the end of the bar and giving added support to that portion which receives the greatest wear.

The splice bars are made in pairs, that is, right and left handed for opposite sides of the rail ends. When applied to rail ends, the sections B of respective bars which are preferably of normal fishing height, fit the fishing space of the rails normally and have a normal draw space between the bar and rail web as shown in Fig. 2. The portions C of the pair of bars being of increased fishing height, are spaced farther from the receiving rails and hence provide an increased draw space as compared to the draw space between the leaving rail and bar, at the same time providing full load-supporting engagement with the fishing surfaces of the receiving rail. The joint therefor is characterized by the provision of a continuous load-supporting engagement between the bar and the flange fishing and head fishing surfaces of the rail with additional draw space between the bar and the receiving rail whereby the life and usefulness of the joint is materially increased.

It will be understood that the proportions of the bar are somewhat exaggerated in the drawing for purposes of illustration.

Our invention is not to be restricted to the precise form and arrangement shown in the drawing and may be embodied in head free, toeless and splice bars as well as angle bars. Furthermore instead of having the increased fishing height of the receiving rail section C pressed only on the upper or head surface, a portion or all of it may be distributed on the flange fishing surface within the scope of the invention.

One of the principal advantages of our invention is that the improved bar may be reformed from a standard bar by a simple hot pressing operation. Accordingly, standard bars may be heated and hot-pressed between dies, it being advantageous to displace metal from the head portion of the bar rather than from the web so as not to materially decrease the load-supporting strength of the bar. Accordingly in reforming the bar the application of pressure is directed to the head portion of the bar where there is an excess of metal, such as at 20 Fig. 5 or 21, Fig. 6, or when necessary to displace metal toward the flange fishing surface, metal may be displaced from the heavier flange side as at 22 (Fig. 5).

The bar according to our invention, is also characterized by a regular section extending through a substantial length and hence is free of irregular bending and shaping as is difficult to maintain uniform throughout a large number of bars. Hence, the bars may be subjected to the required heat treatment and oil quenching without danger of disturbing the shape or fishing heights.

Having described a preferred embodiment of our invention, we claim:

1. A rail joint for one-way track comprising leaving and receiving rails of like size and cross section, a pair of splice bars connecting the adjacent ends of said rails on opposite sides thereof, said bars having normal fishing engagement with said leaving rail but of greater height and greater draw space with said receiving rail.

2. A rail joint for one-way track comprising leaving and receiving rails of substantially like size and shape, a pair of splice bars connecting the adjacent ends of said rails on opposite sides thereof, the portions of said bars adjacent said receiving rail being of greater height than portions adjacent said leaving rail, said bars when applied to said rails providing normal draw space relative to said leaving rail and substantially increased draw space relative to said receiving rail.

3. A rail joint for one-way track comprising leaving and receiving rails of substantially like size and shape, a pair of splice bars connecting the adjacent ends of said rails on opposite sides thereof, said bars when applied to said rail providing continuous load-supporting fishing engagement with the fishing surfaces of both rails, portions of the bars fitting the receiving rail being of greater height than portions of the bars fitting the leaving rail so that the draw space between the bars and the receiving rail is greater than the draw space between the bars and the leaving rail.

4. A rail joint for one-way track comprising leaving and receiving rails of substantially like size and shape, a pair of splice bars connecting the adjacent ends of said rails on opposite sides thereof, said bars when applied to said rail providing continuous load-supporting fishing engagement with the fishing surfaces of both rails, the portions of said bars connected to said receiving rail having a greater fishing height than the portions connected to said leaving rail to provide a greater draw space between said bars and the receiving rail than between the bars and the leaving rail.

5. A splice bar for use in a one-way rail joint having rails of substantially like size and shape in which the bars fit the receiving rail with substantially greater draw space than with the leaving rail, comprising a one-piece structure having head and flange fishing surfaces, the average height of that portion of the bar fitting the receiving rail being greater than the average height of that portion of the bar fitting the leaving rail.

6. A splice bar for use in a one-way rail joint having rails of substantially like size and shape in which the bars fit the receiving rail with substantially greater draw space than with the leaving rail, comprising a one-piece structure having head and flange fishing surfaces, the major portion of the half of the bar fitting the leaving rail being of normal fishing height and the remainder of the bar through its length being of increased fishing height.

7. A splice bar for use in a one-way rail joint having rails of substantially like size and shape in which the bars fit the receiving rail with substantially greater draw space than with the leaving rail, comprising a one-piece structure having head and flange fishing surfaces, the end of said bar fitting the receiving rail being higher than the opposite end, opposite end portions of the bar having parallel head and flange fishing surfaces.

8. A splice bar for use in a one-way rail joint having rails of substantially like size and shape in which the bars fit the receiving rail with substantially greater draw space than with the leaving rail, comprising a one-piece structure having head and flange fishing surfaces, a major portion of the half of the bar fitting the leaving rail having parallel head and flange fishing surfaces of normal fishing height and the half of the bar fitting the receiving rail having parallel fishing surfaces of increased fishing height.

9. A splice bar for use in a one-way rail joint having rails of substantially like size and shape in which the bars fit the receiving rail with substantially greater draw space than with the leaving rail, comprising a one-piece structure having head and flange fishing surfaces, the major portion of the half of the bar fitting the leaving rail having parallel head and flange fishing surfaces of normal fishing height and the half of the bar fitting the receiving rail having parallel fishing surfaces of increased fishing height, the head fishing surfaces of a portion of the bar fitting the leaving rail being upwardly crowned to the higher head fishing surface of that portion fitting the receiving rail.

10. A splice bar for use in a one-way rail joint having rails of substantially like size and shape in which the bars fit the receiving rail with substantially greater draw space than with the leaving rail, said bar being reformed from a standard bar, the major portion of the bar fitting the leaving rail being of normal thickness and fishing height, and the portion of the bar fitting the receiving rail being of slightly less thickness and a of greater fishing height.

11. A splice bar for use in a one-way rail joint having rails of substantially like size and shape in which the bars fit the receiving rail with substantially greater draw space than with the leaving rail, said bar being reformed from a standard bar, the major half of the bar fitting the leaving rail being of normal thickness and fishing height, the major half of the bar fitting the receiving rail being of less thickness and increased fishing height, a portion of the bar fitting the leaving rail being upwardly crowned for the normal height portion to the increased height portion fitting the receiving rail.

LOUIS C. WILKOFF.
STANLEY H. SMITH.